United States Patent [19]

Friedman et al.

[11] Patent Number: 4,792,458
[45] Date of Patent: Dec. 20, 1988

[54] FOOD STUFFS CONTAINING STARCH OF A DULL SUGARY-2 GENOTYPE

[75] Inventors: Robert B. Friedman, Chicago, Ill.; David J. Gottneid, Griffith, Ind.; Eugene J. Faron, Schererville, Ind.; Frank J. Pustek, Munster, Ind.; Frances R. Katz, Crown Point, Ind.

[73] Assignee: American Maize-Products Company, Stamford, Conn.

[21] Appl. No.: 69,260

[22] Filed: Jul. 2, 1987

[51] Int. Cl.$^4$ .................. A23L 1/04; A23L 1/195
[52] U.S. Cl. ................... 426/578; 426/397; 426/407
[58] Field of Search ............ 426/589, 578, 579, 658, 426/549, 293–295; 127/29, 32; 536/102

[56] References Cited

U.S. PATENT DOCUMENTS

4,107,338 8/1978 Tutor et al. .................. 426/549
4,428,972 1/1984 Wurzburg .................... 426/578

OTHER PUBLICATIONS

CA 94(21) 170 612j. Liu T.T. 1981.
CA 93(S) 41737j Soberalske 1980.
CA 92 (13) 107518b Garwood 1980.
CA 85 (13) 92388p Garwood p. 176.
CA 91 (21) 171713t Gentinetta et al. 1979.
BA 78 19313, 84 282833 Biosis.
Genetics and Physiology of Starch Development—Chapter III—Jack C. Shannon and Douglas L. Garwood pp. 25–85.
Cereal Science Today—vol. 13—No. 3—Mar. 1968—Genetic Variations in Maize—RM. M. Sandstedt et al., pp. 82–94.
"Carbohydrate Synthesis in Maize"—Roy G. Creech—pp. 275–322—Pennsylvania State University.
Starch/Starke 33 (1981) Nr. 1, S.9—13—"Some Structural Characteristics of Starches of Maize Having a Specific Genetic Background"—Y. Ikawa et al.
"Genetic Control of Carbohydrate Synthesis in Maize Endosperm"—Roy G. Creech—Dept. of Horticulture, Pennsylvania State University—pp. 1175–1186.
Cereal Chemistry—vol. 39, Nos. 1–6—Jan.—Nov. 1962—Digestibility of High-Amylose Corn Starches Compared to that of Other Starches, the Apparent Effect of the ae Gene on Susceptibility to Amylase Action—Sandstedt et al.—pp. 123–131.
Agron. J.—vol. 50 (1958)—Gene Interactions in Maize Affecting Endosperm Properties—H. Kramer et al.—pp. 207–210.

*Primary Examiner*—Jeanette Hunter
*Attorney, Agent, or Firm*—Lucas & Just

[57] ABSTRACT

A substantially pure starch extracted from a starch bearing plant having a dull sugary-2 genotype is disclosed. Maize is the preferred plant. The starch exhibits a high amylose content with a gelatinization temperature at least 10° C. below that of conventional high amylose starch with comparable amylose content. The starch also exhibits thin-thick canning starch attributes. A sol and foodstuff containing the starch are also disclosed.

9 Claims, 1 Drawing Sheet

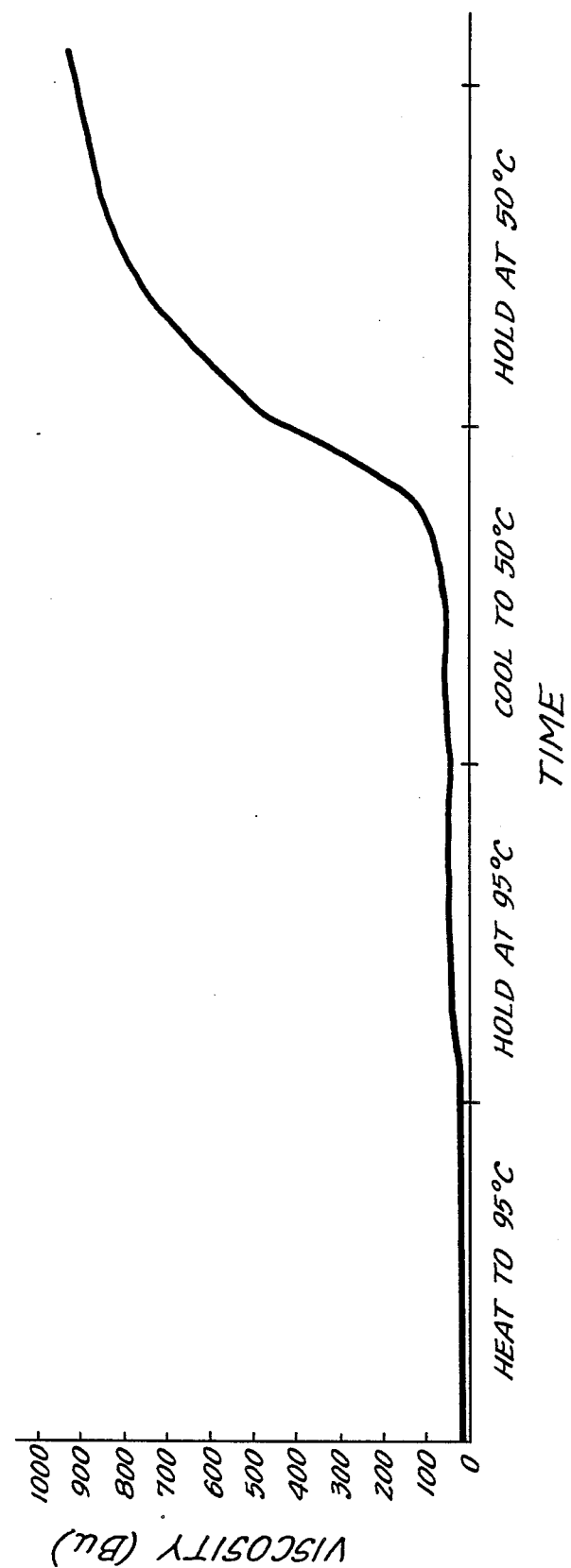

FOOD STUFFS CONTAINING STARCH OF A DULL SUGARY-2 GENOTYPE

This invention relates to starch and more particularly to starch which has been extracted from a plant having a dull sugary-2 (dusu2) homozygous genotype.

Starch occurs in a variety of plants and is generally categorized based on its plant source. For example, cereal starches are extracted from cereal grains such as maize, rice, wheat, barley, oats and sorghum; tuber and root starches are extracted from plants such as potato, sweet potato, arrowroot, yams and cassava; and waxy starches are extracted from plants such as waxy maize, waxy rice, waxy barley and waxy sorghum.

Generally, starch is comprised of two polymers, amylose and amylopectin which are intertwined to form a starch granule. Amylose is a linear polymer of alpha 1-4 bonded anhydroglucose units while amylopectin is a branched polymer comprised of linear chains of alpha 1-4 linked anhydroglucose units with branches resulting from alpha 1-6 linkages between the linear chains.

Each starch bearing plant produces different percentages of amylose and amylopectin, different size granules and different polymeric weights for both the amylose and amylopectin. These differences produce markedly different properties in the starch.

Heretofore, the only way to affect the properties of starch was to physically and/or chemically treat the starch.

It has recently been discovered that there exists a number of recessive mutant genes in starch bearing plants which have an affect on the properties of starch and that by controlled breeding these mutant genes can be expressed.

Some of the mutant genes which have been identified in maize include the genotypes: waxy (wx), amylose extender (ae), dull (du), horny (h), shrunken (sh), brittle (bt), floury (fl), opaque (o), and sugary (su). Nomenclature for some of these mutant genes is based in part on the effect these mutant genes have on the physical appearance, phenotype, of the kernel. It is also known that within these genotypes there are genes which produce starches with markedly different functional properties even though the phenotypes are the same. Such subspecies have generally been given a number after the named genotype, for example, sugary-1 (su1) and sugary-2 (su2).

One combination of these mutant genes which has been found to possess utility is taught in U.S. Pat. No. 4,428,972 issued Jan. 31, 1984 to Wurzburg et al.

It has now been discovered that a plant having a dull sugary-2 (dusu2) homozygous genotype will produce a starch having a gelatinization temperature significantly lower than conventional high amylose starches having comparable amylose content. Specifically, it has been discovered that the starch of the present invention has a gelatinization temperature about 10° C. lower than that of comparable high amylose starch.

It has also been discovered quite unexpectedly that the novel starch of the present invention possesses thin-thick attributes comparable to chemically modified starches used in canning.

FIG. 1 illustrates an amylogram of the starch of the present invention.

Conventional high amylose starches, amylose content equal to or greater than 50%, have a high gelatinization temperature, above about 80° C. Such a high gelatinization temperature increases the processing costs associated with conventional high amylose starch.

The discovery of a high amylose starch with a gelatinization temperature below that of conventional high amylose starch yields a cost savings. Such high amylose starches are especially useful in foods, paper manufacture and fiberglass sizing.

One area of chemically modified starches that has received a great deal of attention is the area of canning starches or thin-thick starches. These starches have a specific utility in canning processes in which high temperatures are attained rapidly and maintained for sterilization of a foodstuff. The starch is typically added to the foodstuff to provide viscosity to the foodstuff. The name thin-thick is given to these starches because of their viscosity behavior, low or thin viscosity initially to allow rapid heat penetration to facilitate sterilization, increased or thick viscosity after sterilization to add body to the canned foodstuff. The term canning as used in the specification and claims means the act of preserving by heat whether the heat is applied before or after the packaging of the food and regardless of the form of the package. Canning includes, for example, pouch packaging, canning, aseptic pack, and retorting. Generally, thin-thick starches are chemically modified such as by hydroxypropylated to a specific degree of substitution and then crosslinked to a specific level. A thin-thick starch specifically developed for retorting is taught in U.S. Pat. No. 4,120,983 issued Oct. 17, 1978 to del Valle et al. The starch taught by the '983 patent is a hydroxypropylated, epichlorohydrin crosslinked tapioca and corn starch derivative.

The discovery that the starch of the present invention can replace these so-called thin-thick chemically modified starches provide economic advantages.

In order to obtain substantially pure starch in accordance with the present invention a plant which produces edible starch and has a dull (du) genotype is crossbred with a plant which produces edible starch and has a sugary-2 (su2) genotype to produce a plant having a dull sugary-2 (dusu2) homozygous genotype. The starch is then extracted from this plant. Both the crossbreeding step and the extraction step of the present invention are carried out in a conventional manner.

In order to prepare a sol in accordance with the present invention, a slurry is prepared which comprises water and an effective amount of starch extracted from a plant of the dusu2 genotype and the slurry subjected to a cooking step. The slurry is cooked as necessary to provide a thickener composition which exhibits thickening characteristics comparable to sols made from conventional high amylose starches. If the starch has been made "cold water swellable", then the cooking step can be eliminated. The preferred amount of starch used in the slurry constitutes about 1 to about 20% by weight of slurry. Generally, coking entails raising the temperature of the slurry to above about the gelatinization temperature of the starch and subjecting the starch to enough shear such that the granules rupture and a paste is formed. It is not necessary that all the granules rupture. Conventional high amylose starches are cooked with special equipment such as jet cookers. Using starch of the present invention, such special equipment is not necessary.

A sol or a thickener composition of the starch of the present invention is added to a foodstuff in a conventional manner to provide the benefits of a high amylose starch to the foodstuff.

Alternatively, starch of the present invention is mixed with a foodstuff or a slurry comprising water and starch of the present invention is mixed with foodstuff and the resulting mixture cooked to produce a thickened foodstuff and to provide the benefits of a high amylose starch to the foodstuff.

In order to replace chemically modified or conventional high amylose starches with starch of the present invention, a replacement ratio of about 1:1, conventional starch:present invention starch, may be employed. Larger or smaller amounts of the starch of the present invention may be used to replace the conventional starch.

The starch of the present invention is employed in a thin-thick starch in canning by mixing starch of the present invention, a slurry or a sol containing the same with a foodstuff suitable for canning. Generally water is included in the mixture. Conventionally, the pH of such a mixture is adjusted, subsequently sealed in a container and subjected to a conventional canning process. During such canning process the contents of the container preferably reaches above about 220° F. for a period of about 5 to about 25 minutes thereby sterilizing the contents of the sealed container. The amount of starch of the present invention employed for such a canning process is an effective amount. Preferably the starch of the present invention is employed in an amount between about 1 to about 20% by weight based on the total weight of the container contents. The sol, a slurry or starch of the present invention is conventionally mixed with the foodstuff.

The term starch as used in the specification and claims means not only the substantially pure starch granules as extracted from a starch bearing plant but also grain products of the starch granule such as flour, grit, hominy and meal.

The term dull sugary-2 or (dusu2) genotype as used in the specification and claims means not only the dusu2 homozygous genotype, dudusu2su2, which has been obtained by standard plant breeding techniques but also the dusu2 genotype which has been moved to another portion of the plant genome by translocation, invesion or any other method of chromosome engineering to include variations thereof whereby the disclosed properties of the starch of the present invention are obtained.

The term high amylose starch means starch having about 50% and above amylose based on the total weight of amylose and amylopectin in the starch granules. Conventional cereal starches and tuber and root starches have about 20% amylose, while waxy starches have less than about 1% amylose.

Any plant source which produces edible starch and which can be crossbred to produce a plant having a dusu2 homozygous genotype may be used. It has been found that maize, rice, barley and sorghum have the mutant genes sugary-2 (su2) and that maize, barley and sorghum have the dull (du) mutant gene. Maize is the preferred plant source. The dull gene in maize is reported to be on chromosome 10 while the sugary-2 gene in maize is reported to be located on chromosome 6. The location of such genes is published in the open literature.

Generally, to obtain a starch bearing plant with both double recessive mutants of the du and su2 genotype, a plant of a du mutant is crossed with a plant having a su2 mutant and thereafter inbred to obtain a plant homozygous in dusu2. After the homozygous dusu2 genotype is obtained, standard breeding techniques are used to obtain hybrid vigor. Hybrids are preferred because of their high starch yield compared to inbred lines. The method of crossing plants and of obtaining specific genotypes in the offspring as well as breeding to obtain hybrid vigor is well known.

Extraction of starch from the plant is well known and typically entails a milling process. In accordance with the present invention, a wet milling process is used to advantage to extract the corn starch from the corn kernels. Corn wet milling comprises the steps of steeping and grinding the corn kernel and then separating the starch from the other components of the kernel. Prior to steeping, the kernels are subjected to a cleaning process to remove any debris which may be present. This cleaning process is usually done at the wet milling plant. The kernels are then steeped in a steep tank where the kernels are contacted with a countercurrent flow of water at an elevated temperature of about 120° F. and containing sulfur dioxide in an amount between about 0.1 to about 0.2% by weight water. The kernels are maintained in the steep tank for about 24 to 48 hours. Next, the kernels are dewatered and subject to a first set of attrition type mill.

The first set of mills generally grind and rupture the kernels causing the germ, corn oil, to be released from the rest of the kernel. A typical attrition type mill used in commercial wet milling processes is sold under the brand name Bauer. The released germ is then separated from the other parts of the kernel by centrifugation. Throughout the grinding steps of the wet milling process the kernel and the kernel components are maintained in a slurry of about 40% by weight solids.

The remaining kernel components which include starch, hull, fiber and gluten, are subjected to a second set of attrition type mills such as the Bauer Mill, to further grind the components and separate the hull and fiber from the starch and gluten. Hull and fiber are generally referred to as bran. Washing screens are used to separate the bran from the starch and gluten. The starch and gluten pass through the screens while the bran does not.

Next, the starch is separated from the protein. This step is done either by centrifugation or by a third grind followed by centrifugation. A commercial centrifugation separator suitable for the present process is the Merco centrifugal separator.

The slurry which contains the starch granules is then dewatered and the resulting granules washed with fresh water and dried in a conventional manner preferably to about 12% moisture.

In this manner, the substantially pure starch of the present invention is extracted from a starch bearing plant of the dusu2 genotype.

Alternatively to the drying step, the starch may be left in suspension and subject to further modification.

Modification of the starch may also be performed on the dried starch. Typically, in order to change the physical and/or chemical structure of the starch granule, the starch is subject to any one or more of eight general treatments. These treatments comprise bleaching, thin boiling, acid treatment, enzyme treatment, dextrinization or dry roasting, etherification, esterification, and crosslinking. Starches which have been treated by any one or more of these eight treatments listed above are conventionally referred to as chemically modified starch.

Bleaching, often referred to as oxidation, is a modification which does not appreciably alter the granular structure of the starch. Oxidation does, however, tend to lighten the color of the granules and reduce the viscosity of the starch paste.

In order to bleach the starch of the present invention, a slurry of starch is prepared of about 5 to about 40% by weight starch. To the slurry sodium hypochlorite is added with about 6% available chlorine (free chlorine) and the slurry is held at about 110° F. for between about 1 to about 20 hours. The slurry is then neutralized with sodium bisulphite and the resulting granules are dewatered, washed and dried in conventional manner.

Such modification makes the starch of the present invention suitable for laundry starch, paper coating and as a textile size.

In order to produce a thin boiled starch of the present invention, a slurry of starch is 5 to about 40% by weight starch. To this slurry, a mineral acid is added and allowed to react with the starch for about 1 to about 100 hours at about 90° to about 120° F. with constant agitation. Such a reaction is done below the gelatinization temperature of the starch. Subsequently, the solution is neutralized, dewatered, washed and dried in conventional manner.

Thin boiling leaves the granules intact and produces a starch product which has a slight reduced viscosity compared to the non-thin boiled starch. If partial or total destruction of the starch granule is sought, the granule may be subjected to acid treatment.

In order to acid treat the starch of the present invention, a slurry of starch about 5 to about 40% by weight starch is prepared. This slurry is reacted with acid, generally a strong acid, at a temperature above gelatinization temperature. Such a procedure is preferably carried out by jet cooking the slurry through a conventional jet cooker with or without acid already in the slurry and then allowing the slurry to react with the acid, adding acid if needed, for a desired period of time or until the desired dextrose equivalent (DE) is reached. The DE is roughly proportional to the length of time for the reaction. Generally, such jet cooking destroys the starch's granular structure.

After acid treatment, the resulting slurry is neutralized, dewatered and dried. Such product may also be subject to conventional carbon treatment and filtration prior to dewatering and drying. Another treatment which degrades the granular structure is enzyme treatment.

In order to enzyme treat the starch of the present invention, a slurry of starch is made up having about 5 to about 40% by weight starch. To this slurry, enzyme is added at the optimum pH and temperature for the enzyme. Some advantage is found by first jet cooking the slurry to open up the starch granules, cooling the slurry to optimum temperature for the enzyme and then adding the enzyme. If the enzyme is jet cook stable then the enzyme can be added to the slurry prior to jet cooking. The slurry may also be treated with acid first to a low DE and then enzyme treated. After enzyme treatment, the product is dewatered and dried. Alternatively, the product may be subject to conventional carbon bleaching and filtration prior to concentration and/or drying.

In order to dextrinize or dry roast the starch of the present invention, acid is added to dry starch granules and the mixture is heated to a temperature of about 250° to about 350° F. for about 3 to about 72 hours. The product, once removed from the heat, is sold as is. The preferred acids are hydrochloric, phosphoric and any mineral acid. Such a method causes the partial breakdown of the granular structure.

In order to etherify the starch of the present invention, a slurry of starch is made up having about 5 to about 40% by weight starch. The pH of the slurry is adjusted to about 10 to about 12 preferably with sodium hydroxide. Next, an etherification agent such as ethylene oxide or propylene oxide is added to the slurry in an amount of about ½ to about 25% depending on the desired degree of substitution. The reaction conditions are held for about 5 to about 30 hours at about 70° to about 120° F. The slurry is then neutralized with any known acid, dewatered, washed and dried.

In order to crosslink the starch of the present invention, a slurry of starch is made up of about 5 to about 40% by weight starch. The pH of the slurry is adjusted to about 8 to about 12 preferably with sodium hydroxide. Optionally, a salt may be added to the slurry to affect swelling of the granules. Then the slurry is reacted with a crosslinking agent such as phosphorous oxychloride, trimetaphosphate salt, or epichlorohydrin at about 70° to about 120° F. for about ½ to about 5 hours. The length of time of the reaction will depend on the amount of crosslinking agent used and the specific crosslinking agent chosen.

In order to esterify the starch of the present invention, a slurry of starch is prepared having about 5 to about 40% by weight starch. The pH of the slurry is then adjusted to about 8 to about 10 and an esterification agent is added to the slurry such as vinyl ester, acetyl halides, acid anhydrides like acetic anhydride, or succinic anhydride. The esterification agent is added slowly while maintaining the pH of the slurry. The reaction is continued for about ½ to about 5 hours at about 80° to about 120° F. Once the reaction is completed to the desired degree of substitution, the slurry is neutralized, dewatered, washed and dried.

Any combination of these modifications may be employed on starch of the present invention.

It has been found that a sol comprising water and an effective amount of starch extracted from a plant of a dusu2 genotype exhibits thickening characteristics which makes the sol a good commercial thickener composition. Such thickener compositions are especially useful in foodstuffs.

The sol is prepared by forming a slurry of water and starch of the present invention and subsequently cooking the slurry thereby forming a paste. Preferably, the sol contains the starch of the present invention in the amount of about 1 to about 20% by weight total sol. The slurry is cooked at a temperature of about 90° C. and above to provide thickening characteristics prior to adding to the foodstuff. Cooking time is about 10 minutes. The sol in accordance with the present invention need not be cooked if the starch has already been subjected to a process which makes it cold water swellable. Cooking generally comprises raising the temperature of an aqueous slurry of the starch of the present invention to the gelatinization temperature of the starch and subjecting the starch to shear such that the starch granules rupture and form a paste.

In order to prepare the thickened foodstuff, a sol made in accordance with the present invention is combined with a foodstuff and the composition is cooked to the necessary degree to provide a thickened foodstuff. Conventional mixing is employed to combine the sol with the foodstuff. Cooking of the sol and foodstuff composition is also carried out in a conventional manner.

Alternatively, starch of the present invention is mixed with the foodstuff or a slurry comprising the starch of the present invention and water is mixed with a foodstuff and the resulting mixture is cooked to the desired degree to obtain a thickened foodstuff. When the starch itself or a slurry containing the starch itself is mixed with a foodstuff, the resulting mixture must be cooked in order to provide a thickened foodstuff. The mixing as well as the cooking is accomplished in a conventional manner. Cooking is carried out at a temperature of about 90° C. and above. Cooking time is about 10 minutes but may vary depending on the amount of foodstuff present and the amount of shear that the mix is subject to during cooking.

Such a thickener composition provides high amylose characteristics, such a good gel strength while lowering the cooking temperature (gelatinization temperature) for the starch as compared to conventional high amylose starches.

To employ the starch of the present invention as a thin-thick canning starch, the starch of the present invention, a slurry or a sol containing the starch of the present invention is mixed with a foodstuff, placed in a sealed container and subjected to a heating process in which the temperature of the container content reaches about 220° F. and is held there for about 5 to about 25 minutes to accomplish sterilization.

These and other aspects of the present invention may be more fully understood with reference to the following examples.

EXAMPLE 1

This example illustrates the extraction of the starch of the present invention from a dusu2 maize kernel produced by conventional crossbreeding and tests the starch to determine its various characteristics. The tests as well below. The extraction process as well as the test procedures followed are outlined following Table I below:

TABLE I

| | Present Invention | |
|---|---|---|
| Test | Sample A | Sample B |
| Percent Protein (dry basis) | 1.11% | 1.43% |
| Percent Oil (dry basis) | 0.06% | 1.43% |
| Percent Amylose (starch basis) | 61.8% | 59.5% |
| DSC Gelatinization Temp. | 62.5° C. | 60.8° C. |
| Regular Brabender Amylograms | | |
| Initial Rise | 94° C. | 90° C. |
| Heating Peak | 50 BU | 30 BU |
| Heating Final | 50 BU | 30 BU |
| Cooling Peak | 1000 BU | 545 BU |
| Cooling Final | 1000 BU | 545 BU |
| Acid Brabender Amylograms | | |
| Initial Rise | 89° C. | 93.5° C. |
| Heating Peak | 100 BU | 60 BU |
| Heating Final | 100 BU | 60 BU |
| Cooling Peak | 1920 BU | 1885 BU |
| Cooling Final | 1920 BU | 1885 BU |
| Brookfield Viscosities (RPMs) | | |
| 10 | 51,500 cps | 52,000 cps |
| 20 | 30,000 cps | 33,750 cps |
| 50 | 15,600 cps | 15,400 cps |
| 100 | 8500 cps | 9550 cps |
| 50 | 15,000 cps | 13,400 cps |
| 20 | 29,000 cps | 26,000 cps |
| 10 | 53,000 cps | 50,000 cps |
| Hercules Viscosity (RPMs) | | |
| 550 | 396.15 cps | 298.85 cps |
| 1100 | 229.02 cps | 183.91 cps |

TABLE I-continued

| | Present Invention | |
|---|---|---|
| Test | Sample A | Sample B |
| 1650 | 174.0 cps | 141.52 cps |
| 2200 | 144.42 cps | 113.10 cps |
| 1650 | 164.72 cps | 127.60 cps |
| 1100 | 187.38 cps | 156.15 cps |
| 550 | 264.1 cps | 229.35 cps |

Crossbreeding

In order to perform the crossbreeding process, typically maize plants having the mutant gene du were cross-pollinated with maize plants having the mutant gene su2. From the mature ears of some of these plants, kernels having dusu2 homozygous genotype were produced. Such kernels were used to produce starch in accordance with the present invention and to provide seed for future maize plants of the dusu2 homozygous genotype.

Extraction Process

The following extraction process was used to extract the starch from the kernel. Sample A was grown in a dent corn background, OHIO 48, while Sample B was grown in a dent corn background, W64A.

Steeping

Steeping was carried out by adding maize kernels to water having a 0.2% $SO_2$ content and holding the temperature of the steep water at 50° C. for 48 hours. The steep water was circulated through the steep container. After the 48 hours of steeping, the kernels were dewatered and washed with water.

Grinding and Separating

A mixture of 1:1 kernels to water in a weight ratio was prepared and added to a Waring blender equipped with a dull blade. The Waring blender was put on grind for one minute to mill the starch. The resulting mash was poured onto a 40 mesh screen and what passed through the 40 mesh screen was passed through a 200 mesh screen and subsequently through a 325 mesh screen. The resulting filtrate contained starch and protein. That which did not pass through the first 40 mesh screen was put back into the Waring blender with water in a 1:1 weight ratio of kernels to water. This time a sharp blade was used and the Waring blender was set for one minute on grind. The resulting mash was then subject to a 40 mesh screen and then the filtrate was subjected to a 200 mesh screen and finally to a 325 mesh screen. The final filtrate from both the dull blade grind and the sharp blade grind were dewatered and contained starch and protein. The starch and protein were reslurried and subjected to three separate centrifuges to remove the starch from the protein.

The final starch was then filtered and dried in an oven at 110° C. overnight to a moisture content of approximately 10%.

In this manner, starch was extracted from corn kernels in the lab.

The percent protein was determined by a standard Corn Refiners Association (CRA) method (Kjeldahl method).

The percent oil was also done using a standard CRA method by extracting the oil from dry, ground kernels using carbon tetrachloride for sixteen hours.

The percent amylose was determined using standard calorimetric iodine procedures wherein the starch is first gelatinized with sodium hydroxide and then reacted with an iodine solution and the resulting sample measured using a spectrophotometer in a 1 cm cell at 600 nm against a blank of 2% iodine solution.

The DSC gelatinization temperature was measured using a scanning calorimeter manufactured by Mettler Model No. 300 using a 30% solid starch following the procedure outlined in the owner's manual for that model.

Two Brabender amylographs were run; one in a non-acid environment and one in an acid environment. Both were run at 12% solids using a 90 gram sample with 125 gram cartridge at 100 RPM. The exact procedure used is outlined in the Amylograph Handbook of the American Association of Cereal Chemists, 1982 edition at pages 17 and 18. The respective paddle for the 90 gram cup was used. The difference between the acid and the regular Brabender was that 1.56 grams of glacial acetic acid was added to the sample to drop the pH of the sample to about 3 prior to running of the samples. Such acid test is used to show stability in acid conditions.

The initial rise was the temperature at which the pen moves away from the baseline.

Both acid and regular samples were subjected to identical heat profiles. The sample started at room temperature and the rapid heat mode of the instrument was used to heat the sample to 50° C. Once 50° C. was reached, the instrument was set at a controlled rate of heating, 1½° C./minute, until a temperature of 95° C. was reached. The sample was then held at 95° C. for 30 minutes. During this period of heating, the highest viscosity obtained by the sample was labeled Heating Peak. The Heating Final was the last viscosity obtained by the sample at the end of the heating cycle. Next, the sample was cooled at 1½° C. to a temperature of 50° C. The sample was then held at 50° C. for 30 minutes. The largest viscosity measurement taken during this cooling cycle was the Cooling Peak and the final viscosity at the end of the cooling cycle was the Cooling Final.

Brabender curves are a well known tool for determining characteristics of starch.

Brookfield viscosities, another well known measurement used for analysing starch was measured for the starch of the present invention in Table I above. In order to run this test, the starch slurry as it came from the regular, non-acid Brabender test was used for the Brookfield test.

A Brookfield viscometer Model RV was used following standard procedures to obtain these values. The tests were run at 50° C. with each RPM being run for a twenty second time interval.

Hercules viscosities were run on a Kaltec Model No. 244RC (manufactured Aug. 31, 1975) following the procedure outlined in the operators manual. Each test was run at 75° F. using bob A. A 25 gram sample of starch paste as obtained from the acid Brabender was used for this test. Hercules viscosities measured high shear resistance of starch in an acid environment.

EXAMPLE 2

This example illustrates the high amylose content, low gelatinization temperature of the present invention compared to conventional high amylose starches in maize. The results of this example are listed in Table II below.

TABLE II

| Starch Samples | % Amylose | Gelatinization Temperature °C. |
|---|---|---|
| 1. Native common maize | 27.6 | 70.8 |
| 2. AMY V | 58.0 | 78.6 |
| 3. AMY VII | 69.7 | 87.0 |
| 4. Native dusu2 (Sample A) | 61.8 | 62.5 |
| 5. Native dusu2 (Sample B) | 59.5 | 60.8 |

Sample 1 was a commercial product sold by American Maize-Products Company, Hammond, Ind. The percent amylose and gelatinization temperature are mean values determined from random sampling of the product. The 99% confidence interval for the percent amylose and the gelatinization temperature were 25.9 to 29.3 and 68.7 to 72.9 respectively.

AMY V and AMY VII are commercial high amylose starches sold by American Maize-Products Company, Hammond, Ind. The percent amylose and gelatinization temperature for the AMY V and AMY VII are mean values determined from a random sampling of the product. The 99% confidence interval for the percent amylose in AMY V and AMY VII were 53.4 to 62.5 and 65.5 to 73.8 respectively. The 99% confidence interval for the gelatinization temperature of the AMY V and AMY VII was 72.8 to 84.4 and 83.1 to 90.8 respectively. Both AMY V and AMY VII were grown in native maize.

Samples 4 and 5 correspond to Samples A and B of Example 1 above.

The percent amylose and gelatinization temperature were obtained using the procedure in Example 1 above.

EXAMPLE 3

This example illustrates the synergistic nature of the starch of the present invention. The results of this example are listed in TABLE III below.

TABLE III

| Starch Samples | % Amylose | Gelatinization Temperature °C. |
|---|---|---|
| 1. Native common maize | 27.6 | 70.8 |
| 2. Native du grown in OHIO 48 | 33.2 | 72.3 |
| 3. Native du grown in W64A | 38.8 | 72.5 |
| 4. Native su2 grown in OHIO 48 | 39.5 | 63.3 |
| 5. Native su2 grown in W64A | 42.0 | 60.8 |
| 6. Native dusu2 grown in OHIO 48 | 61.8 | 62.5 |
| 7. Native dusu2 grown in W64A | 59.5 | 60.8 |

Sample 1 is Sample 1 of Table II above. Samples 6 and 7 are Samples A and B of Example 1 above.

Samples 2-5 were extracted from maize kernels according to the procedure in Example 1 above. The procedure in Example 1 was used to determine both percent amylose and gelatinization temperature.

It is readily apparent that the starch of the present invention has a higher amylose content than its individual parents yet has a low gelatinization temperature.

Samples 2 and 3 were extracted from the kernels according to the procedure outlined in Example 1 above. The procedure used to determine the percent amylose and gelatinization temperature of the samples in Table II above was that outlined in Example 1 above.

It is readily apparent that the starch of the present invention has a gelatinization temperature lower than starches with comparable amylose content. It is readily apparent that the starch of the present invention has a gelatinization temperature about 10° C. lower than starch containing comparable percent amylose.

EXAMPLE 4

This example illustrates the thin-thick attributes of the starch of the present invention.

The general attributes of a commercial thin-thick starch as shown by a non-acid Brabender amylogram run in accordance with Example 1 above at 5.5% solids shows a rise of not more than 300 BU during the addition of heat to the sample, a slow rise of viscosity during the hold at 95° C. cycle and continued gradual rise during the full cooling cycle. A gentle rise is about 10 BU per minute for the amylogram run in accordance with Example 1 above.

FIG. 1 illustrates the general amylogram for Sample B of Example 1. This amylogram was run in accordance with Example 1.

It is readily apparent that the starch of the present invention has an amylogram similar to that of thin-thick starch.

EXAMPLE 5

This example illustrates preparing a thickener composition in accordance with the present invention.

The starch of the present invention as extracted in Example 1 above is mixed with water in an amount to produce a slurry having 10% by weight starch. The sol has a bland taste. The sol when cooked at about 90° C. for ten minutes produces a thickener composition.

EXAMPLE 6

This example illustrates the use of the present invention to make imitation mayonnaise. Table IV below illustrates the ingredients which are used and following the table the procedure used to prepare the mayonnaise is outlined.

TABLE IV

| Ingredients | % by Weight Present Invention |
| --- | --- |
| Water | 51.5 |
| Vinegar (5%) | 3.0 |
| Starch of Example 1 | 3.8 |
| Mustard Flour | 1.0 |
| Salt | 0.7 |
| Oil | 35.0 |
| Egg Yolk | 4.4 |
| Whole Egg | 0.6 |
| | 100.0 |

Procedure

In order to prepare mayonnaise using starch of the present invention, water, starch and vinegar in the amounts listed in Table IV above are mixed to form a slurry. Next, egg yolks, whole eggs and mustard in the amounts listed in Table IV above are blended together and added to the slurry. Next, the oil is slowly mixed into the slurry and mixing continued until an emulsion is formed. This is then touched with phosphoric acid.

EXAMPLE 7

This example illustrates using the present invention in retort canning.

A medium is prepared by mixing 6% starch of the present invention with 90% water, 1% salt and 30% sugar. The pH of the system is adjusted to neutral, pH 6.5, with vinegar as needed. This medium is then mixed with foodstuffs, mixed vegetables, to obtain a final mixture that contains about 50–60% by weight mixed vegetables. The final mixture is placed in a container and sealed. The sealed container is then subjected to a retort process.

Although the use of the present invention has been disclosed primarily with respect to foods, this is not deemed to limit the scope of this invention. The present invention can be used in other fields of industry such as paints, plastics, paper, wallboards.

It will be understood that the claims are intended to cover all changes and modifications of the preferred embodiments of the invention herein chosen for the purposes of illustration which do not constitute a departure from the spirit and scope of the invention.

What is claimed is:

1. A thickened foodstuff for canning comprising a foodstuff, water and having as an essential ingredient therein an effective amount of a natural thin-thick starch, said starch extracted from a starch bearing plant having a dull sugary-2 genotype, said starch providing no effective thickening characteristics to said foodstuff before canning while providing effective thickening characteristics to said foodstuff after canning.

2. The thickened foodstuff of claim 1 wherein the starch bearing plant is maize and the starch is extracted from kernels of maize.

3. The thickened foodstuff of claim 1 wherein the amount of starch present is about 1% to about 20% by weight based on the total weight of thickened foodstuff.

4. The thickened foodstuff of claim 3 wherein the starch bearing plant is maize and the starch is extracted from kernels of maize.

5. A method for making a thickened foodstuff comprising combining a foodstuff, water and an effective amount of a natural thin-thick starch, said starch extracted from a starch bearing plant having a dull sugary-2 genotype and subjecting said combination to a canning process whereby said starch provides no effective thickening characteristics to said foodstuff before canning while providing effective thickening characteristics to said foodstuff after canning.

6. The method of claim 5 wherein the starch is extracted from a maize kernel.

7. The starch of claim 6 in granular form.

8. The method of claim 5 wherein the water and starch are combined together first and then subsequently combined with the foodstuff.

9. The method of claim 6 wherein the amount of starch added is about 1% to about 20% by weight based on total weight of foodstuff.

* * * * *